UNITED STATES PATENT OFFICE.

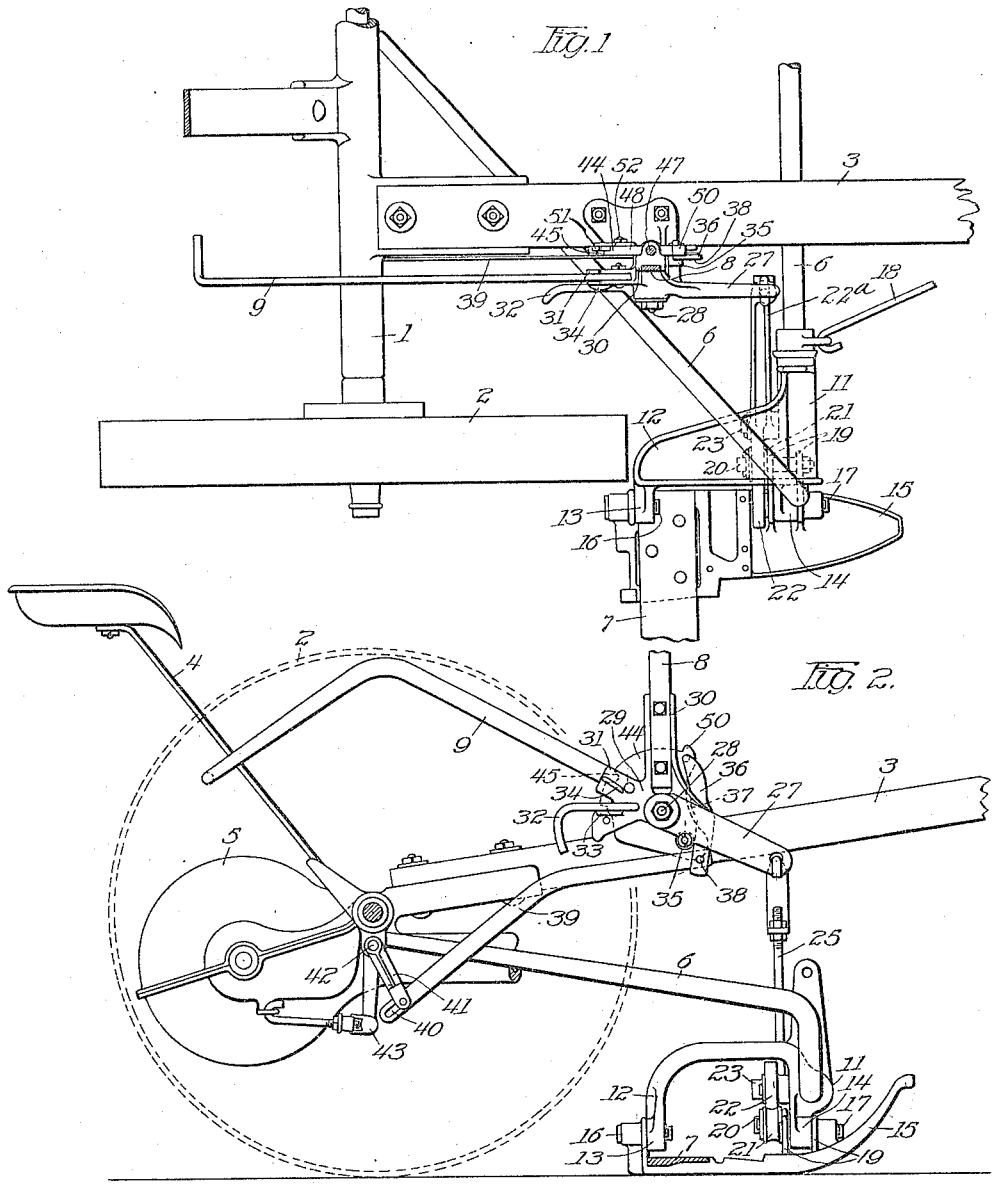

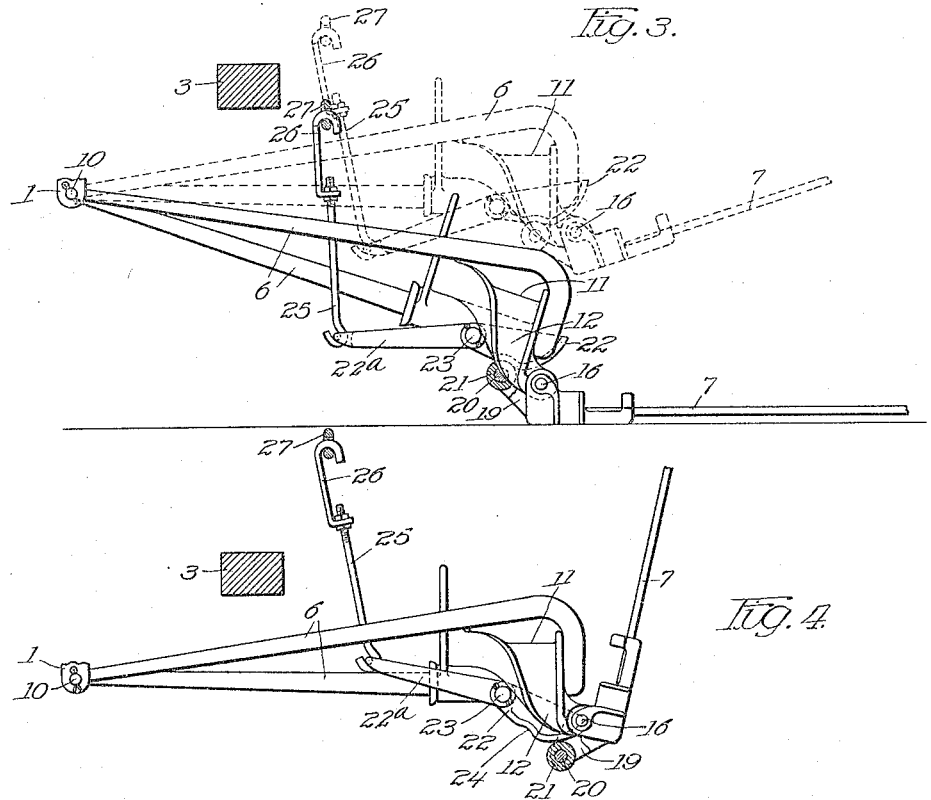

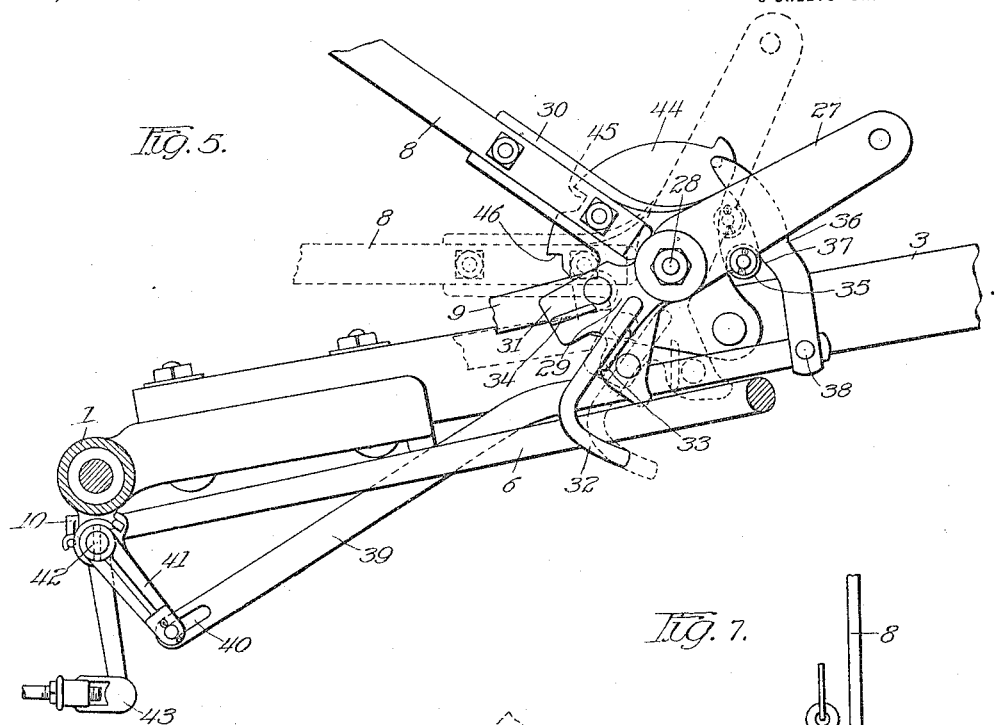
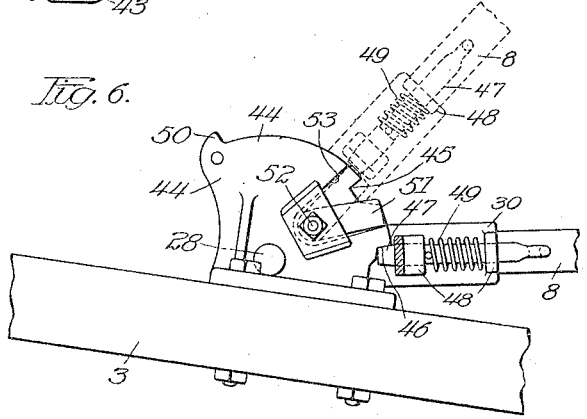
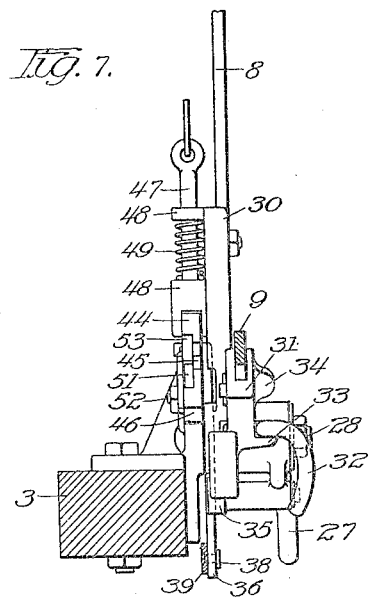

CHARLES PEARSON, OF CHICAGO, ILLINOIS, ASSIGNOR TO INTERNATIONAL HARVESTER COMPANY OF NEW JERSEY, A CORPORATION OF NEW JERSEY.

MOWING-MACHINE.

1,213,942.   Specification of Letters Patent.   Patented Jan. 30, 1917.

Application filed June 14, 1913. Serial No. 773,629.

*To all whom it may concern:*

Be it known that I, CHARLES PEARSON, a citizen of the United States, residing at Chicago, in the county of Cook and State of Illinois, have invented certain new and useful Improvements in Mowing-Machines, of which the following is a full, clear, and exact specification.

My invention relates to mowing machines. It has among its objects to adjust the finger bar of a mower in an improved manner.

Further and more specific objects of my invention are to raise and lower the finger bar, position the same securely in cutting position, adjust the mower clutch automatically in predetermined positions of the finger bar, support and release the coupling frame automatically at predetermined times, and enable the operator to adjust the operating lever, all in an improved manner and with increased facility.

I attain these objects by providing improved automatic means operatively connected to the operating lever which, in predetermined positions of the latter, act automatically and in a predetermined sequence to raise or lower the coupling frame, to support or release the same, to throw in or out the clutch mechanism, raise or lower the finger bar, hold the same in its up position, and also enable the operating hand lever to be automatically raised as the finger bar is lowered without it being necessary for the operator to retain his grip on the detent mechanism thereon the parts automatically returning to their normal or cutting position.

In the accompanying drawings I have illustrated one embodiment which my invention may assume in practice. It is to be understood, however, that the form shown herein for purposes of illustration may be modified without departing from the spirit of my invention.

In these drawings: Figure 1 is a top plan view of the mower equipped with my improvement. Fig. 2 is a side elevation of the same. Fig. 3 is a detail view showing the coupling frame in its different positions, the finger bar remaining in its lowest position. Fig. 4 is a detail view showing the coupling frame raised and the finger bar moved to a vertical position. Fig. 5 is a detail view of the lever actuated mechanism carried on the pole, showing the lever in its different positions. Fig. 6 is a detail view of the latch mechanism for the lever. Fig. 7 is an end view of the lever and its coöperating mechanism carried on the pole, looking in a direction at right angles to Fig. 5 toward the front of the machine.

In the construction shown, I have illustrated a mower comprising a main frame 1 mounted on wheels 2 and including a forwardly protruding pole 3, a seat 4, gear and clutch mechanism mounted in a casing 5 being operatively connected to the wheels in the usual manner, a coupling frame 6 being pivotally connected to the main frame and freely movable about its pivot on the stubbleward end thereof in a vertical direction, a finger bar 7 being pivotally connected to and independently movable with respect to the coupling frame, and both the finger bar 7 and coupling frame 6 being adapted to be raised or lowered upon movement of a hand lever 8 pivoted on the tongue, while the coupling frame 6 is also movable by a foot lever 9 similarly pivoted.

The coupling frame 6 comprises a single round rod pivoted at its stubbleward end in a well known manner as at 10 on the rear of the main frame adjacent the clutch and gear casing 5. As shown, this member 6 is provided with a portion protruding substantially transversely of the line of draft beneath the pole and in front of the wheels 2 to a point slightly beyond the inner wheel, where it is bent upward and then over rearwardly and stubblewardly and protruded backward substantially at an angle of 45° toward its pivot 10. Upon the free or grassward end of this coupling frame 6 a bracket 11 is mounted; this bracket being provided with a transversely disposed bore through which the transverse portion of the coupling frame 6 extends, and also being provided with a rearwardly extending substantially U shaped projection or extension 12 and laterally extending spaced bearings 13 and 14 in which the finger bar shoe 15 is journaled on pins 16 and 17 in such a manner that it may swing independently of the coupling frame about its axis of these pins. As in the usual construction, the coupling frame 6 may be connected to the pole 3 through any suitable link connection 18.

Rotatably mounted upon stubblewardly protruding extensions 19 on the under side of the bracket 11 is a rearwardly disposed spindle 20 having a roller or sheave 21 thereon. Coöperating with this roller is an arc shaped elongated cam 22 pivoted at 23 to the bracket member 11 and extending transversely with respect to the line of draft with its active surface adapted to move transversely of the roller 21 and made convex so that it will coöperate with the concave working surface of the roller and move readily over the same. Further, in order to position the roller, and therefore the finger bar 7 when the latter is in its cutting or operative position, a notch 24 is provided on the cam at a point intermediate its ends and preferably adjacent the pivot 23 in which the roller or sheave 21 is adapted to fit. This cam member 22 has integral therewith a transversely disposed arm 22ª and is connected with an upwardly extending adjustable link connection 25 removably attached by a hook 26 to the forwardly protruding end of a member 27 pivoted at 28 on the tongue 3. As shown, this member 27 is integral with a bracket member 29 on which both the foot lever 9 and the hand lever 8 are carried so that as these levers are moved, the bracket 29 and the member 27 are thrown upward or downwardly to raise or lower the arm 24 and throw the finger bar upward or downward in a manner hereinafter described. As shown, these levers 8 and 9 are rigidly and pivotally connected respectively in a well known manner to the bracket member 29, and turnable on the pivot 28 therewith. As in the usual construction, in order to strengthen the connection, the bracket is provided with suitable slotted projections 30 and 31 receiving the ends of the levers and in which the latter are attached by any suitable means, the lever 9 being so connected that the bracket 29 and lever 8 may be moved independently thereof after the rear end of that lever strikes against the main frame in its down position.

Upon the grassward side of this bracket member 29 and at a point at the rear of the pivot 28 thereof, a downwardly extending hooked member 32 is pivoted and movable therewith; this member being controlled in its movement in opposite directions and moved thereby within certain limits by spaced laterally extending stop members 33 and 34 integral with the bracket member 29. During the downward movement of the foot and hand levers 9 and 8 respectively, that is, a rearward movement of the same, when the coupling frame is raised, this hook 32 is moved downward and in a forward direction with the bracket 29 from the position shown in Fig. 2 and is forced under the diagonally disposed member of the coupling frame 6 by an engagement therewith of the stop member 34 as the lever 8 approaches its rearward limit, as shown by dotted lines in Fig. 5, to act as a support for the coupling frame and securely hold the same in position. It is to be noted that during this movement of the levers, the stop 34 thereon serves to insure the movement of the hook in a downward direction and under the coupling frame 6, while the coöperating stop 33 serves to insure the movement of the hook in the opposite direction so that the hook 32 is disengaged and the coupling frame freed to drop to its normal position.

Coöperating with a laterally protruding roller 35 journaled on the stubbleward side of the pivoted bracket 29 and at a point beneath the bracket pivot 28 and slightly in front thereof, is an upstanding cam member 36 elongated and provided with a curved substantially arc shaped concave cam surface equipped with a rearwardly projecting peak 37 at a point substantially intermediate its ends and on the edge thereof adjacent the roller 35. This cam member 36 is pivoted at 38 to a longitudinally disposed downwardly extending link 39, connected through a slotted connection 40 at its rearward end with a rocking lever 41 pivoted at 42 on the main frame and operatively connected through the usual lever connection 43 with the clutch mechanism.

Coöperating with the movable lever 8 is a sector 44 rigidly attached to the grassward side of the pole and serving as a bearing for the pivot pin 28 upon which the movable bracket member 29 is mounted. This sector, instead of being provided with a number of teeth extending over the entire working edge thereof, is only provided with a single notch 45 intermediate its ends and having an inclined end wall and an end notch 46 (Figs. 5 and 6.) Coöperating with these notches is a plunger 47 slidable in spaced lugs 48 on the bracket 29 and operated through a suitable detent or thumb lever actuating mechanism carried on the handle of the lever (not shown). This plunger 47 is normally held in its operative or down position by a coiled spring 49 positioned between the guiding lugs 48 on the bracket; an upstanding lug 50 on the sector 43 limiting the movement of the same and that of the lever in one direction. Coöperating with this detent mechanism is a movable or swinging notch masking or latch member 51 pivoted at its inner end at 52 to the sector 44 and housed in a substantially V-shaped slot 53 in the latter, disposed in a plane parallel to the plane of the sector and on the opposite side of the sector from the notch 45. The outer end of this slot is shown to be more than twice as wide as the latch member 51 or the notch 45 and the movable member 51 is freely movable from side to side therein from the position shown in full lines in Fig. 6, wherein it is substantially clear of the notch 45, to the position shown in dotted lines in that figure wherein it closes the slot, the lever 8 as it is thrown forward carrying with it the member 51 which then acts to prevent the plunger 47 of the detent mechanism from engaging in the notch 45. Obviously, after the detent has passed the notch 45, the pivoted latch 51 will again resume its normal or full line position due to its own weight, thus clearing the notch 45.

The operation of the construction shown is as follows: In the normal or down position, the parts occupy the position shown in Figs. 1 and 2, wherein the finger bar 7 lies flat upon the ground, the coupling frame 6 is down, the hand lever 8 is vertically disposed, the foot lever 9 is up, the roller 21 is in engagement with the notch 24 on the cam 22, the hook 32 is raised, and the roller 35 is out of engagement with the projection 37 on the cam 36 so that the clutch mechanism is thrown in. When the operator desires to raise the finger bar 7, as, for instance, in passing over an obstruction or in transport, this is accomplished by pressing down the foot lever 9. The movement of this lever rotates the member 27 about its pivot 28 on the pole and through its link connection 24, 25, 26, acts to raise the coupling frame 6 about its pivotal connection 10 to the dotted line position shown in Fig. 3. It will be noted that due to the connection of the finger bar 7 to this frame 6, i. e., the notched cam 22 and its operating mechanism, the bar 7 will, during this upward movement, be maintained in a fixed position relative to the coupling frame 6 and be lifted up therewith about the pivot of the latter so that when the coupling frame 6 is again lowered the cutter bar is again in cutting position, i. e., flat upon the ground. It is to be noted also that the operator is enabled to lock the parts in their elevated position just mentioned while the knife is still running, by throwing back the lever 8 to a sufficient degree to cause the detent on the same to engage the first notch 45 in the sector 44, thus enabling him to attend to his team and drop the finger bar very quickly when desired. By releasing the lever 8 from its engagement with the sector, the parts obviously will drop of their own weight and automatically resume their normal position shown in Fig. 2. On the contrary, should the operator, after the parts are in the position shown in dotted lines in Fig. 3, desire to raise the finger bar to its vertical position, i. e., move the same independently of the coupling frame, as, for instance, when going from the field, this may be readily accomplished by grasping the hand lever 8 and throwing the same backward about its pivot 28, the plunger 47 of the detent mechanism then sliding up the inclined wall of the notch 45 and out of the latter without it being necessary to manipulate the detent mechanism. During this movement of the lever 8, the member 27 is raised still higher and the roller 35 is brought into engagement with the surface or peak 37 of the cam 36, throwing out the clutch mechanism when the finger bar has reached a position just above that shown in dotted lines in Fig. 3 and just after the lever 8 has moved past the notch 45. It is to be noted in this connection, that during the continued upward movement of the member 27, through its link connection with the finger bar the cam 22 is forced downward so that it forces the roller 21 toward its outer end, i. e., out of the notch and along the rounded extremity of the cam, in such a manner as to swing the finger bar upward into the substantially vertical position shown in Fig. 4, and that the actuation of the clutch mechanism to throw the knife mechanism on the finger bar out of gear, occurs after the lever passes the notch 45 and before the finger bar commences to turn about its pivot 16, 17 on the bracket 11 in moving to its up position. It is thus seen that the operator is enabled to raise or lower the finger bar within the limits required in passing obstructions without throwing the cutting mechanism out of gear, but that when the same is raised above these limits, as when the finger bar is thrown to its upper or vertical position, the clutch mechanism is automatically operated.

It is further to be noted that as the hand lever 8 moves backward its plunger 47, without any manipulation on the part of the operator, slides over the upper working edge of the sector 43 from the position shown in Fig. 2, until it snaps automatically into the notch 45 (Fig. 3.) As the lever 8 is pressed farther downward, the plunger 47 thereon then snaps into engagement with the notch 46 at the rear edge of the sector, occupying this position when the coupling frame and finger bar are in the position shown in Fig. 4, or dotted lines in Fig. 5, that is, the up or vertical, inoperative position. Should the operator, however, desire to lower the parts from that position, i. e., move the lever in the reverse direction, it is to be noted that it is only necessary for him to release the latch mechanism from the end notch 46, whereupon the lever 8 is free to move throughout the remainder of its travel toward its vertical or operative position without it being necessary for the operator to hold on to the latch mechanism, thus enabling him to be entirely free to attend to his team; the pivoted latch 51 closing the notch 45 and permitting free movement of the lever to its forward or operative position. In this connection it is also to be noted that due to the weight of the balanced finger bar 7, the latter will then be free to propel the levers 8 and 9 and their coöperating parts through the remainder of their travel, the hook 32 and the cam 36 being automatically actuated to release the coupling frame and permit the same to drop and to throw in the clutch mechanism quickly at the proper time with a minimum jar to the parts; the finger bar 7 and frame 6 being released by the hook 32 and dropping into the position shown in Fig. 2 when the finger bar and coupling frame are in alinement. It is to be noted that in this construction the operator is enabled to raise the cutter bar from its cutting or down position and move the same bodily with the cutter frame without throwing the cutter bar out of gear when passing small obstructions; this lifting action being obtained by movement of either the foot lever or the hand lever, and the weight of the cutter bar being carried by the coupling frame and bracket 11 due to the rigid connection obtained by the movable cam 22.

It is further to be noted that the operator may also slightly raise the cutter bar with respect to the coupling frame without throwing out the clutch mechanism, but that when the cutter bar reaches a predetermined angle with respect to the then stationary coupling frame, this clutch mechanism is automatically and rapidly actuated to throw the same out and thus disconnect the cutter bar. Attention is further directed to the fact that when the cutter bar is thus moved, the coupling frame in which it is pivoted, is at that time supported by the hook so that a substantial support is provided and undue strain upon the coupling frame is avoided.

It will also be noted that in my improved construction the hook 32 moves on a radius with the lever 8 and that this hook, due to its coöperation with the members 33 and 34 carried by the lever, has its hook portion automatically lowered or raised in such a manner as to facilitate disengagement of the coupling frame, or to hold the latter securely in its up position and thereby prevent swinging or looseness of the upper end of the cutter bar when the latter is in its vertical position. In this connection it is also to be noted that due to the improved controlling mechanism for the hand lever, the operator is free to raise the coupling frame and the cutter bar and move the cutter bar upward with respect to the coupling frame to a position which would enable him to pass even a large obstruction, the clutch not being thrown out until the parts occupy the position shown in full lines in Fig. 5.

It is further to be noted that during the movement of the hand lever, the operator is only required to actuate the detent mechanism at one point, namely, to release the lever from the end notch in returning the cutter bar to its operative position; the mechanism being operated upon simple movement of the lever without actuation of the detent mechanism as the lever moves to and from all other positions, as the plunger slides freely over the inclined face of the latch 51 when the lever is thrown backward from the notch 45 and that notch is closed when the lever is moved over the same while traveling in the opposite direction. This is particularly important when the lever moves from its extreme down position, after release from the rear notch to lower the cutter bar, the operator when approaching the field being thus able to rapidly lower the cutter bar and at the same time to have free use of his hands in driving his team.

It will also be noted that in my improved construction the operator may, by raising or lowering the plunger of the detent mechanism, control the position of the notch masking member or latch 51. In moving the lever forward it is also possible to skip over the member 51, if desired, and have the lever 8 held in its middle position with the plunger 47 in engagement with the notch 45, by simply raising the detent mechanism as it passes over the member 51. Attention is also directed to the fact that in drawing back the lever the plunger 47 may be snapped into the notch 45 and automatically disengaged therefrom upon a continued movement of the lever in the same direction and without any manipulation of the detent mechanism, this being due to the coöperation of the inclined wall of the notch 45 and the plunger 47.

While I have in this application described one embodiment which my invention may assume in practice, it is, of course, to be understood that the form shown herein for purposes of illustration may be modified without departing from the spirit of my invention.

What I claim as my invention and desire to secure by Letters Patent is:—

1. In a mowing machine, a frame, a finger bar flexibly connected therewith, a lifting lever pivotally mounted upon said frame and operatively connected with said finger bar in a manner to raise or lower it, a spring-pressed detent slidable upon said lever, a sector secured to said frame and having a notch therein adapted to receive said detent, a notch masking member pivotally mounted upon said sector eccentric to the axis of said lifting lever and having a limited swinging movement toward or from said notch, said detent engaging with said masking member in a manner to swing it forward to a notch masking position when said lever is moved in a direction to lower said finger bar.

2. In a mowing machine, a machine frame, a rising and falling coupling frame carried thereon, a finger bar pivotally connected to said coupling frame, a lifting lever pivoted on said machine frame, operative connections between said lever and said coupling frame and finger bar operable upon movement of said lever to vary the position of said coupling frame and bar in a predetermined sequence, and a coupling frame supporting hook carried on said lever and movable on a radius therewith.

3. In a mowing machine, a machine frame, a rising and falling coupling frame carried thereon, a finger bar pivotally connected to said coupling frame, a lifting lever pivoted on said machine frame, operative connections between said lever and said coupling frame and finger bar operable upon movement of said lever to vary the position of said coupling frame and bar in a predetermined sequence, a coupling frame supporting hook pivoted on said lever and movable on a radius therewith, and means movable with said lever for moving said hook about its pivot.

4. In a mowing machine, a machine frame, a coupling frame pivoted thereon, a finger bar pivoted on said coupling frame, a lifting lever pivoted on said machine frame, operative connections between said lever and said finger bar and coupling frame operable to vary the elevation of each of said last mentioned elements in a predetermined sequence, a coupling frame supporting member pivoted on said lifting lever at one side of the pivot thereof, and means engageable with said supporting member upon movement of said lever for moving the supporting member about its pivot on said lever.

5. In a mowing machine, a machine frame, a coupling frame pivoted thereon, a finger bar pivoted on said coupling frame, a lifting lever carried on said machine frame, operative connections between said lever and said coupling frame and finger bar operable to vary the elevation of each of said last mentioned elements in a predetermined sequence, a coupling frame supporting hook pivoted to said lifting lever and means movable with said lever and engageable with said hook after a predetermined movement of said lever in either direction for moving said hook to and from its supporting position.

In testimony whereof I affix my signature, in the presence of two witnesses.

CHARLES PEARSON.

Witnesses:
RAY PATTISON,
R. W. MARTIN.

Copies of this patent may be obtained for five cents each, by addressing the "Commissioner of Patents, Washington, D. C."